G. E. SENSENEY.
COLOR AND DESIGN STUDY.
APPLICATION FILED NOV. 26, 1915.
1,247,160.
Patented Nov. 20, 1917.
2 SHEETS—SHEET 1.
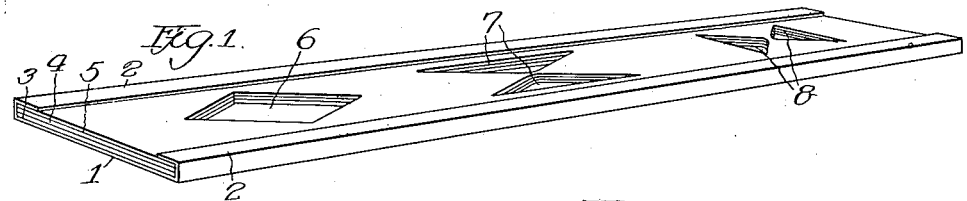
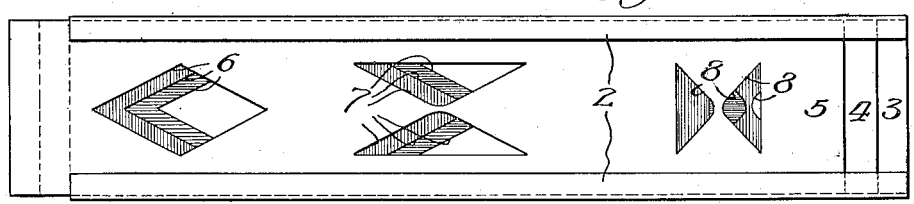
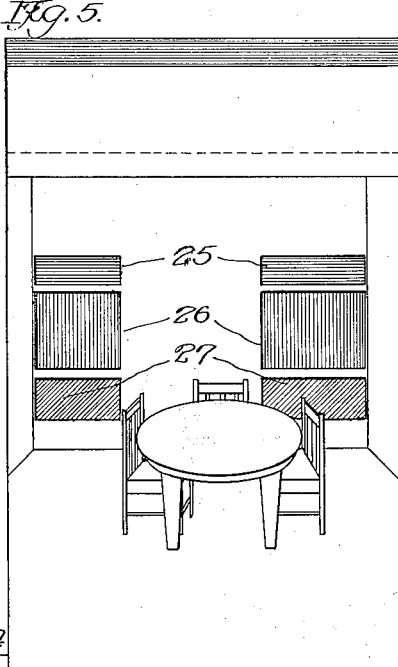
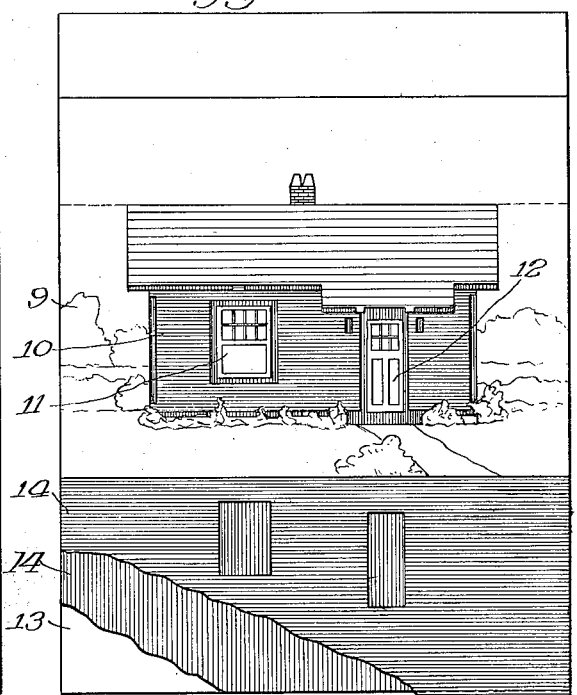
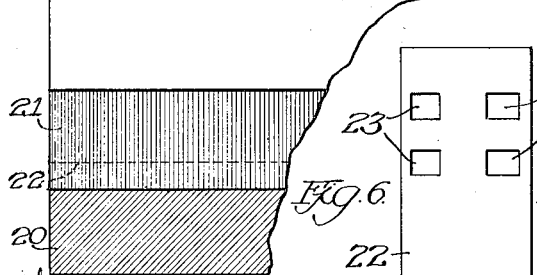
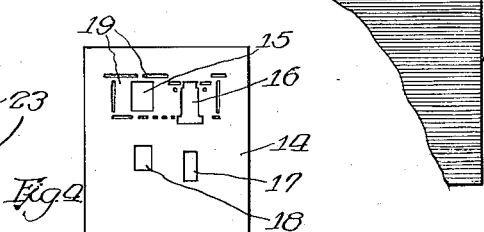
Witnesses:
Inventor
George E. Senseney

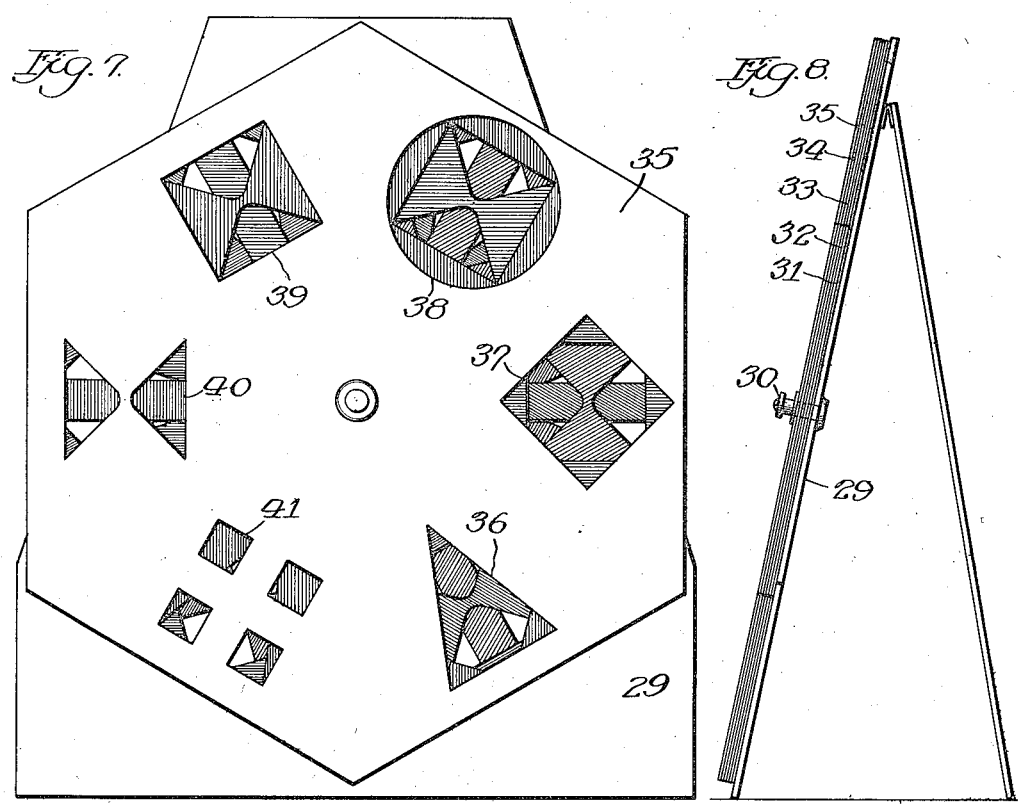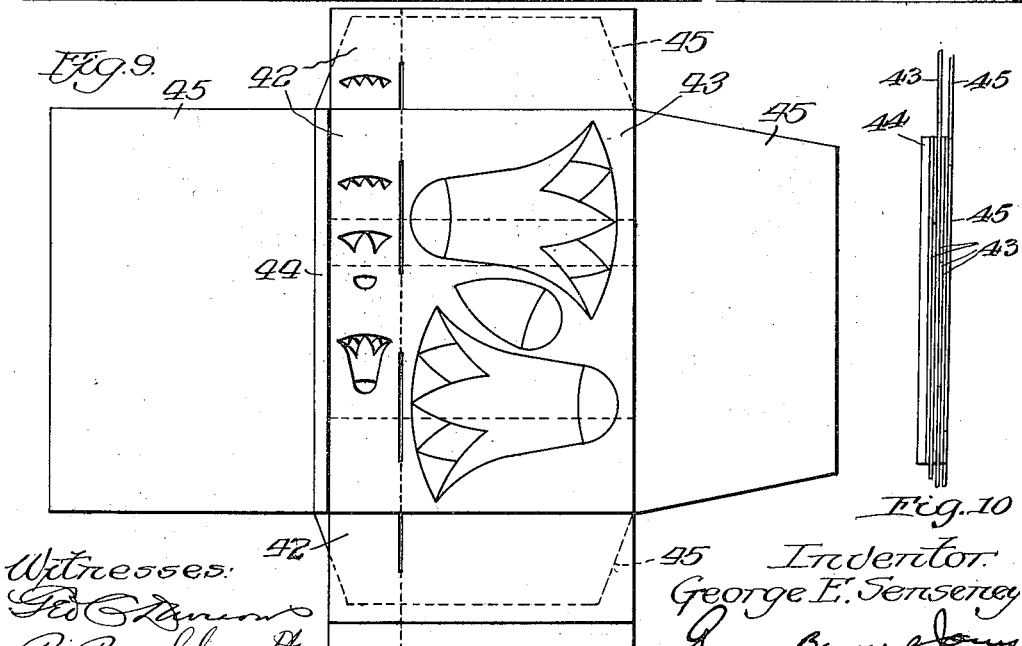

UNITED STATES PATENT OFFICE.

GEORGE E. SENSENEY, OF CHICAGO, ILLINOIS.

COLOR AND DESIGN STUDY.

1,247,160.  Specification of Letters Patent.  Patented Nov. 20, 1917.

Application filed November 26, 1915. Serial No. 63,672.

*To all whom it may concern:*

Be it known that I, GEORGE E. SENSENEY, citizen of the United States, residing at Chicago, in the county of Cook and State of Illinois, have invented a certain new and useful Improvement in Color and Design Study, of which the following is a full, clear, concise, and exact description.

My invention relates to color and design study.

It is designed primarily to aid the student, artist, designer, interior decorator and others, in the selection and study of combinations of colors and designs, although it is also adapted for use as a toy, and in various other ways.

The general object of the invention is to provide convenient means for permitting the ends above specified, to be obtained. Another object is to provide means whereby any color may be placed in any portion of a given area in conjunction with one or more colors and may be repeated, made to predominate, diminish or disappear from the area at will.

In the accompanying drawings, I have illustrated several embodiments of the invention. Said invention in its broad aspects is susceptible of innumerable embodiments however, and therefore those I have illustrated are not to be taken as limiting the invention in any sense, but as suggestive of a few of the possibilities.

Figure 1 is a perspective view of a form of the invention, in which superimposed strips of paper of different colors are arranged to slide longitudinally in suitable guides.

Fig. 2 is a top plan view thereof with the strips displaced relatively to each other.

Fig. 3 is a form of the invention, in which superimposed color sheets are employed in conjunction with a mask representing the elevation of a house and its surroundings.

Fig. 4 is a plan of one of said sheets.

Fig. 5 is a somewhat similar representation of an interior elevation of a room.

Fig. 6 is a plan of one of the sheets used therewith.

Fig. 7 is a front elevation of a series of rotatably mounted color sheets.

Fig. 8 is a side elevation thereof.

Fig. 9 is a plan of a series of color sheets in portfolio form with auxiliary leaves which may be detached, and Fig. 10 is a side elevation thereof.

Referring now more particularly to Figs. 1 and 2, it will be seen that the container is in the form of a channel member 1, having the sides 2 bent over to form guide ways. The container is preferably made of sheet metal, although of course I do not limit myself to such a structure. Within the container a plurality of sheets or strips of colored paper 3, 4, 5 are arranged. These strips may be slid freely back and forth one over the other. The strips are all of different colors, and in the present instance I have illustrated only three to avoid unnecessary complications, although ordinarily a greater number would be employed. Said sheets or strips, although conveniently made of paper, may be made of cardboard, wood, celluloid, mica, glass, cloth, metal or other material, preferably thin and flat.

The strips shown in these figures have openings 6, 7, 8 cut therein. I have illustrated three such openings, although of course the number and form thereof may be varied. The openings in each strip are all different; the openings in each strip, however, being the same as the openings in the remaining strips, whereby all the openings register when the strips are in the position shown in Fig. 1.

In order to study the effect of any one color, in the area represented by one of the openings for example, the strip of that color is slid back and forth beneath the top strip to make said color increase or decrease at will. In Fig. 2 all three strips are shown relatively displaced, whereby all three colors, for example buff, blue and brown, may be seen at once and their effectiveness studied in each of the three different areas represented by the openings. Assuming that the top strip is buff, the middle strip blue and the lower strip is brown, it will be seen that the blue area may be increased by simply sliding the blue strip to the right or it may be decreased by sliding it to the left, at the same time, either moving the bottom strip, or holding it stationary, dependent on whether it is desired to increase the effect of the brown or leave it unchanged. In addition to the endless possibilities of combinations of colors afforded by this arrangement, it will be seen that various geometric designs are suggested owing to the relative displacement of the cut out portions. The top strip forms a mask and may be turned end to end so that the upper openings are not necessarily the same as those beneath, or an additional strip may be used having openings therein, constituting masks, which openings may be the same or may be different from the openings which register with each other. The masks may also be printed in one or more colors or with figures thereon.

In Fig. 3 the same general principle of relatively movable, superimposed color sheets is employed. The upper sheet or mask 9 has the picture of a house 10 and surroundings printed thereon in color. The window 11 and door 12 are pasted on to the under sheet 13 in order to hold them in place, or they may be printed thereon. The intervening sheets, of which 14 is a sample, are simply plain color sheets having openings therein shown in Fig. 4. The openings 15, 16 represent the window and the door respectively and are slightly larger than the corresponding lower openings 17, 18. The series of smaller openings 19 represent the trim. In the arrangement shown in Fig. 3 there are two sheets 14 of different color, superimposed over the back sheet 13, said sheets being displaced longitudinally as shown, whereby the lower of the two sheets 14 shows the color for the trim, and is seen surrounding the window, door, and following the lines of the eaves, the end walls and the base of the house. The upper of the two sheets 14 shows the color of the side wall and the top sheet 9 shows the roof and the surroundings.

In Figs. 5, 6 a somewhat similar arrangement is shown, whereby the different colors of the dado, frieze, and wall may be experimentally determined. The cut out, which serves as a mask, has openings different from those in the preceding figure, but the general arrangement and functioning of the superimposed sheets is the same. The three sheets 20, 21, 22, are all alike except that they are of different color and have four openings 23 cut therein, as shown in Fig. 6. The top sheet 24 has three sets of cut outs 25, 26, 27, respectively, representing the frieze, wall and dado. With the cards arranged as shown in Fig. 6, these three areas of the elevation may be represented in different colors.

In order to vary the respective color areas, any relative movement of the superimposed sheets may be employed. In the preceding figures and in Fig. 1 particularly, the sheets are slid longitudinally one over the other. They may, however, be moved about a pivot, and such an arrangement is shown in Figs. 7, 8.

In said Figs. 7 and 8 an easel 29 is disclosed, provided with a pivotal pin 30, on which are mounted a plurality of sheets 31, 32, 33, 34, 35, the number being susceptible of modification. These various sheets are of different colors and are rotatable about the axis 30, whereby the cut out portions 36, 37, 38, 39, 40, 41, may be superimposed over the openings in the corresponding under sheets. Various designs and combinations of colors may thereby be studied in a manner similar to that explained in connection with Figs. 1 and 2.

It is of course obvious that the superimposed sheets need not necessarily always be moved in a fixed relation but may be slid over each other in any direction by omitting the guides or the pivotal pin.

In Figs. 9 and 10 I have illustrated a plurality of strips 42 having detachable leaves 43. Said strips may be slid one over the other, being guided by a small wooden guide 44 secured to a backing 45, constituting a portfolio, which portfolio may be folded over to inclose the sheets 42, 43. The strips 42 are used to study new designs, in various colors, the figures thereon being preferably printed instead of being cut out or stamped out whereby the student is required to cut them out as a preliminary step. The sheets 43 have figures outlined thereon, which may be cut out with shears and pasted on to a suitable background of cardboard to carry out on a larger scale, the designs suggested by moving the strips 42. This latter arrangement is particularly advantageous for students' use, since they may make their own designs and carry them out. Sheets 43 are preferably detachable.

Any of the devices described herein may of course be used as a toy, although they are intended for more serious use by students, designers and interior decorators.

It is obvious from the foregoing explanation that an indefinite number of designs may be studied by varying the cut out areas and using all the feasible combinations of colors.

What I claim as new and desire to secure by Letters Patent of the United States is:

1. In a device of the class described, a plurality of superimposed sheets of various colors, each having a series of openings therein arranged to register with the openings in the remaining sheets, and means for holding said sheets in the desired relation but permitting relative movement thereof to introduce different colors into the area of the openings, in varying relations.

2. In a device of the class described, a plurality of superimposed sheets of different color, each having a series of unlike perforations therein, the perforations in each sheet being identical with those in the remaining sheets, said sheets being slidable one over the other, whereby various designs and combinations of colors may be produced.

3. In a device of the class described, a plurality of superimposed strips slidable one over the other, and having registering openings therein and means for guiding said strips.

4. A device for aiding in the study of color and design, which consists of a plurality of superimposed, perforated, colored strips slidable one over the other to produce various geometrical figures and various color combinations, and auxiliary colored sheets secured to and detachable from said strips, having figures thereon which may be cut out in accordance with the designs suggested by said strips.

5. A device for aiding in the study of color and design, which consists of a suitable backing provided with a guide at one side thereof, a plurality of superimposed, perforated, colored strips slidable along said guide to produce various geometrical figures and various color combinations, and auxiliary colored sheets secured to and detachable from said strips, having figures thereon which may be cut out in accordance with the designs suggested by said strips.

6. In a device for color and design study, the combination with a plurality of sheets of different color having various figures thereon, of a plurality of auxiliary, superimposed strips of the same color as said sheets, having perforations therein of the same form, as said figures, whereby said strips may be used to produce various designs which may be made permanent by cutting out said figures and securing them to a suitable background in the desired relation.

7. In a device of the class described, a plurality of superimposed sheets of various colors, an opening in each of said sheets adapted to register with the openings in each of the other of said sheets, and means for holding said sheets in the desired relation but permitting relative movement thereof to introduce different colors in varying relations into the area of the opening in the uppermost of said sheets.

8. In a device of the class described, a plurality of superimposed sheets of various colors slidable one over the other and having registering openings therein, whereby relative movement of said sheets introduces different colors into the area of said openings in varying relations.

In witness whereof, I hereunto subscribe my name this 19th day of Nov. A. D., 1915.

GEORGE E. SENSENEY.